(12) United States Patent
Patil et al.

(10) Patent No.: US 9,177,177 B1
(45) Date of Patent: Nov. 3, 2015

(54) SYSTEMS AND METHODS FOR SECURING STORAGE SPACE

(71) Applicants: Sushil Patil, Maharashtra (IN); Suprio Das, West Bengal (IN); Sanjay Jain, Maharashtra (IN); Anirban Mukherjee, West Bengal (IN)

(72) Inventors: Sushil Patil, Maharashtra (IN); Suprio Das, West Bengal (IN); Sanjay Jain, Maharashtra (IN); Anirban Mukherjee, West Bengal (IN)

(73) Assignee: Symantec Corporation, Mountain View, CA (US)

( * ) Notice: Subject to any disclaimer, the term of this patent is extended or adjusted under 35 U.S.C. 154(b) by 148 days.

(21) Appl. No.: 13/645,372

(22) Filed: Oct. 4, 2012

(51) Int. Cl.
  *G06F 13/00* (2006.01)
  *G06F 21/78* (2013.01)
  *G06F 21/12* (2013.01)

(52) U.S. Cl.
  CPC .............. *G06F 21/78* (2013.01); *G06F 21/121* (2013.01)

(58) Field of Classification Search
  CPC . G06F 2212/00; G06F 2212/21; G06F 21/78; G06F 21/121; G06F 11/1004; G06F 3/0641; G06F 3/064
  USPC ......................................................... 711/163
  See application file for complete search history.

(56) References Cited

U.S. PATENT DOCUMENTS

| | | | | |
|---|---|---|---|---|
| 5,963,977 | A * | 10/1999 | Gold et al. ..................... | 711/156 |
| 6,223,269 | B1 * | 4/2001 | Blumenau ..................... | 711/202 |
| 7,562,197 | B2 * | 7/2009 | Kano ........................... | 711/152 |
| 7,685,378 | B2 * | 3/2010 | Arakawa et al. ............... | 711/154 |
| 7,711,897 | B1 * | 5/2010 | Chatterjee et al. ............ | 711/114 |
| 7,822,939 | B1 * | 10/2010 | Veprinsky et al. ............ | 711/170 |
| 8,397,038 | B2 * | 3/2013 | Scales et al. .................. | 711/156 |
| 8,732,411 | B1 * | 5/2014 | Chatterjee et al. ............ | 711/147 |
| 8,825,937 | B2 * | 9/2014 | Atkisson et al. .............. | 711/102 |
| 2004/0236897 | A1 * | 11/2004 | Cheng .......................... | 711/103 |
| 2005/0021944 | A1 * | 1/2005 | Craft et al. ..................... | 713/161 |
| 2008/0301354 | A1 * | 12/2008 | Bekooij ........................ | 711/100 |
| 2009/0248763 | A1 * | 10/2009 | Rajan et al. ................... | 707/204 |
| 2009/0300301 | A1 * | 12/2009 | Vaghani ........................ | 711/162 |
| 2009/0300302 | A1 * | 12/2009 | Vaghani ........................ | 711/162 |
| 2009/0307423 | A1 * | 12/2009 | Galloway et al. ............. | 711/114 |
| 2010/0250896 | A1 * | 9/2010 | Matze ........................... | 711/216 |
| 2010/0299491 | A1 * | 11/2010 | Ueda ............................. | 711/162 |
| 2011/0307659 | A1 * | 12/2011 | Hans et al. .................... | 711/114 |
| 2012/0023233 | A1 * | 1/2012 | Okamoto et al. ............. | 709/226 |
| 2012/0054410 | A1 * | 3/2012 | Vaghani et al. ................ | 711/6 |
| 2012/0054746 | A1 * | 3/2012 | Vaghani et al. ................ | 718/1 |

(Continued)

OTHER PUBLICATIONS

Anand Shimpo, The SSD Anthology: Understanding SSDs and New Drives from OCZ. Andantech.com. Mar. 18, 2009.*

(Continued)

*Primary Examiner* — Jared Rutz
*Assistant Examiner* — Khoa D Doan
(74) *Attorney, Agent, or Firm* — ALG Intellectual Property, LLC

(57) ABSTRACT

A computer-implemented method for securing storage space may include 1) identifying a block map that indicates whether each of a plurality of blocks within a storage system is to return zeroed data in response to read operations, 2) identifying a read operation directed to a block of the storage system that includes non-zeroed data, 3) determining, in response to identifying the read operation, that the block map indicates that the block is to return zeroed data in response to the read operation, and 4) returning zeroed data in response to the read operation based on determining that the block map indicates that the block is to return zeroed data. Various other methods, systems, and computer-readable media are also described.

20 Claims, 8 Drawing Sheets

(56) References Cited

U.S. PATENT DOCUMENTS

| | | | |
|---|---|---|---|
| 2012/0137064 A1* | 5/2012 | Patocka et al. | 711/114 |
| 2012/0137089 A1* | 5/2012 | Numata et al. | 711/156 |
| 2012/0221855 A1* | 8/2012 | Orsini et al. | 713/167 |
| 2012/0265920 A1* | 10/2012 | Baron | 711/6 |
| 2012/0278580 A1* | 11/2012 | Malige et al. | 711/166 |
| 2012/0317333 A1* | 12/2012 | Yamamoto et al. | 711/103 |
| 2012/0331242 A1* | 12/2012 | Shaikh et al. | 711/154 |
| 2013/0054979 A1* | 2/2013 | Basmov et al. | 713/193 |
| 2013/0198459 A1* | 8/2013 | Joshi et al. | 711/130 |
| 2014/0012940 A1* | 1/2014 | Joshi et al. | 709/214 |
| 2014/0013059 A1* | 1/2014 | Joshi et al. | 711/144 |
| 2014/0114933 A1* | 4/2014 | Chandrasekarasastry et al. | 707/692 |

OTHER PUBLICATIONS

John Savill, "Hat is the TRIM function for solid state disks (SSDs) and why is it important?". WindowsITpro.com. Apr. 21, 2009.*

Ladu, Definitions of terms : TRIM. Wiki. Jul. 7, 2011.*

Anindya Banerjee, et al; Systems and Methods for Reclaiming Storage Space from Virtual Machine Disk Images; U.S. Appl. 13/302,813, filed Nov. 22, 2011.

Jasper Spaans; LKML.org; http://lkml.org/lkml/2012/17/336, as accessed on Jun. 13, 2012.

* cited by examiner

US 9,177,177 B1

SYSTEMS AND METHODS FOR SECURING STORAGE SPACE

BACKGROUND

Consumers and organizations increasingly rely on digitally-stored data. As the cost of digital data storage decreases and the reliance on digitally-stored data increases, file systems may manage ever greater amounts of data. These file systems may allocate and/or deallocate storage space from storage systems as needed.

Because the same storage space can be reused over time (e.g., deallocated after a prior use and reallocated for a new use), some allocation schemes may allow access to old data (e.g., meant to have been deleted) through new allocations. For example, when a file is deleted from a file system, the storage blocks underlying the file may be deallocated from the file, but the contents of the storage blocks may remain intact. Subsequently, one or more of these storage blocks may be pre-allocated to a new file of a predetermined size. Unfortunately, in some cases this data may be sensitive. Even though access to the original file may have been restricted, the sensitive data may become accessible via the newly pre-allocated file.

Some traditional file systems may attempt to prevent such data leaks by overwriting pre-allocated storage blocks (e.g., with zeroed data). Unfortunately, overwriting the pre-allocated storage blocks may be time- and resource-intensive, especially in the case of pre-allocating storage blocks for very large files. Furthermore, future read operations directed to these files may consume significant computing resources. Accordingly, the instant disclosure identifies and addresses a need for additional and improved systems and methods for securing storage space.

SUMMARY

As will be described in greater detail below, the instant disclosure generally relates to systems and methods for securing storage space by maintaining a block map for blocks that are to be zeroed out and reading first from the block map to determine whether to return zeroed data or the actual content of the corresponding block. In one example, a computer-implemented method for securing storage space may include 1) identifying a block map that indicates whether each of a plurality of blocks within a storage system is to return zeroed data in response to read operations, 2) identifying a read operation directed to a block of the storage system that includes non-zeroed data, 3) determining, in response to identifying the read operation, that the block map indicates that the block is to return zeroed data in response to the read operation, and 4) returning zeroed data in response to the read operation based on determining that the block map indicates that the block is to return zeroed data.

In some examples, the computer-implemented method may also include initializing the block map by marking each free block within the plurality of blocks to indicate that the free block is to return zeroed data in response to read operations. In one example, a file may include the plurality of blocks.

In some embodiments, the computer-implemented method may also include 1) identifying a write operation directed to the block and 2) marking the block map to not indicate that the block is to return zeroed data in response to read operations. Additionally or alternatively, in some examples, the computer-implemented method may include 1) identifying a deallocation of the block and 2) marking the block map to indicate that the block is to return zeroed data in response to read operations. In these examples, the computer-implemented may also include 1) identifying an additional block map and 2) marking the additional block map to indicate that the block is subject to a trim operation in response to identifying the deallocation of the block. In these examples, marking the block map to indicate that the block is to return zeroed data may include marking the block map to indicate that the block is to return zeroed data before the trim operation is performed.

In one example, the computer-implemented method may also include 1) identifying an additional read operation directed to an additional block of the storage system, 2) determining, in response to identifying the additional read operation, that the block map does not indicate that the additional block is to return zeroed data in response to the additional read operation, and 3) reading and returning content of the additional block in response to determining that the block map does not indicate that the additional block is to return zeroed data.

In one embodiment, returning the zeroed data may include returning the zeroed data without reading the zeroed data from the block on the storage system. In some examples, the block may have been previously allocated for use in an old thin-provisioned logical disk and may be currently allocated for use in a new thin-provisioned logical disk while still including data from the old-thin provisioned logical disk.

In one embodiment, a system for implementing the above-described method may include 1) an identification module programmed to identify a block map that indicates whether each of a plurality of blocks within a storage system is to return zeroed data in response to read operations, 2) an interception module programmed to identify a read operation directed to a block of the storage system that includes non-zeroed data, 3) a determination module programmed to determine, in response to identifying the read operation, that the block map indicates that the block is to return zeroed data in response to the read operation, and 4) a returning module programmed to return zeroed data in response to the read operation based on determining that the block map indicates that the block is to return zeroed data. The system may also include at least one processor configured to execute the identification module, the interception module, the determination module, and the returning module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a block map that indicates whether each of a plurality of blocks within a storage system is to return zeroed data in response to read operations, 2) identify a read operation directed to a block of the storage system that includes non-zeroed data, 3) determine, in response to identifying the read operation, that the block map indicates that the block is to return zeroed data in response to the read operation, and 4) return zeroed data in response to the read operation based on determining that the block map indicates that the block is to return zeroed data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
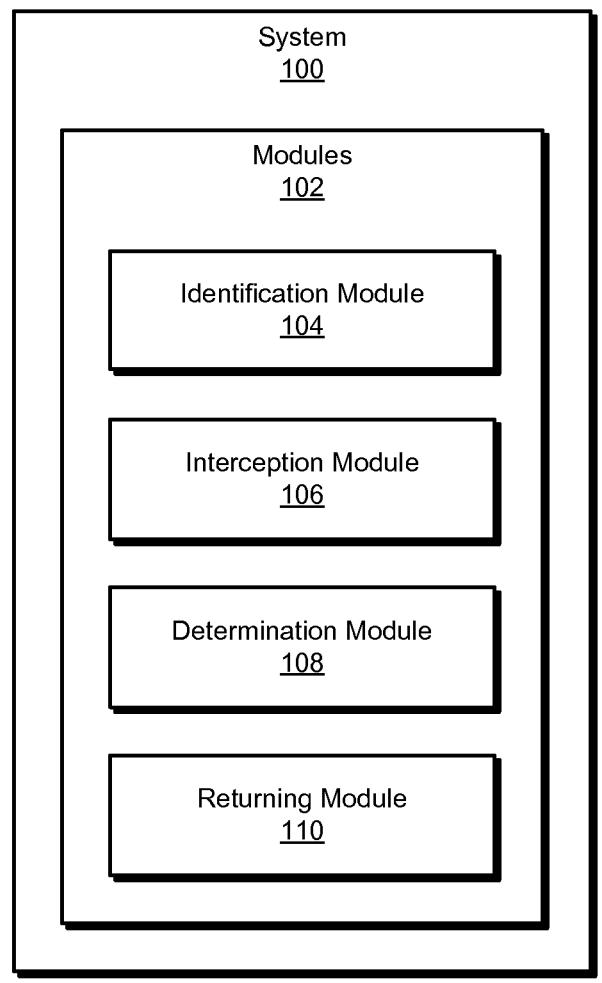
FIG. 1 is a block diagram of an exemplary system for securing storage space.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for securing storage space. As will be explained in greater detail below, by maintaining a block map for blocks that are to be zeroed out and reading first from the block map to determine whether to return zeroed data or the actual content of the corresponding block, the systems and methods described herein may provide zeroed data where desired (e.g., pre-allocated blocks) while avoiding costly write operations to zero out blocks. Additionally, these systems and methods may avoid unnecessary read operations on zeroed blocks by providing zeroed data on the basis of the block map instead of performing read operations on an underlying storage device. In some examples, these systems and methods may also provide information for thin provisioning systems (e.g., for reclaiming zeroed-out blocks, for providing zeroed data without writing zeroed data to blocks moving between thin-provisioned logical storage devices, etc.). In some examples, these systems and methods may also prevent transaction processing delays by maintaining an additional block map for pending trim operations. In these examples, these systems and methods may also use the additional block map to improve storage utilization for thin-provision-capable storage devices, to optimize reclamation operations performed for such devices, and/or to prevent the allocation of previously unused free space.

The following will provide, with reference to FIGS. 1, 2, 5, and 6, detailed descriptions of exemplary systems for securing storage space. Detailed descriptions of corresponding computer-implemented methods will also be provided in connection with FIG. 3. Detailed descriptions of an exemplary storage device and block map are provided in connection with FIG. 4. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for securing storage space. As illustrated in this figure, exemplary system 100 may include one or more modules 102 for performing one or more tasks. For example, and as will be explained in greater detail below, exemplary system 100 may include an identification module 104 programmed to identify a block map that indicates whether each of a plurality of blocks within a storage system is to return zeroed data in response to read operations. Exemplary system 100 may also include an interception module 106 programmed to identify a read operation directed to a block of the storage system that includes non-zeroed data.

In addition, and as will be described in greater detail below, exemplary system 100 may include a determination module 108 programmed to determine, in response to identifying the read operation, that the block map indicates that the block is to return zeroed data in response to the read operation. Exemplary system 100 may also include a returning module 110 programmed to return zeroed data in response to the read operation based on determining that the block map indicates that the block is to return zeroed data. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or storage system 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Figure 2:
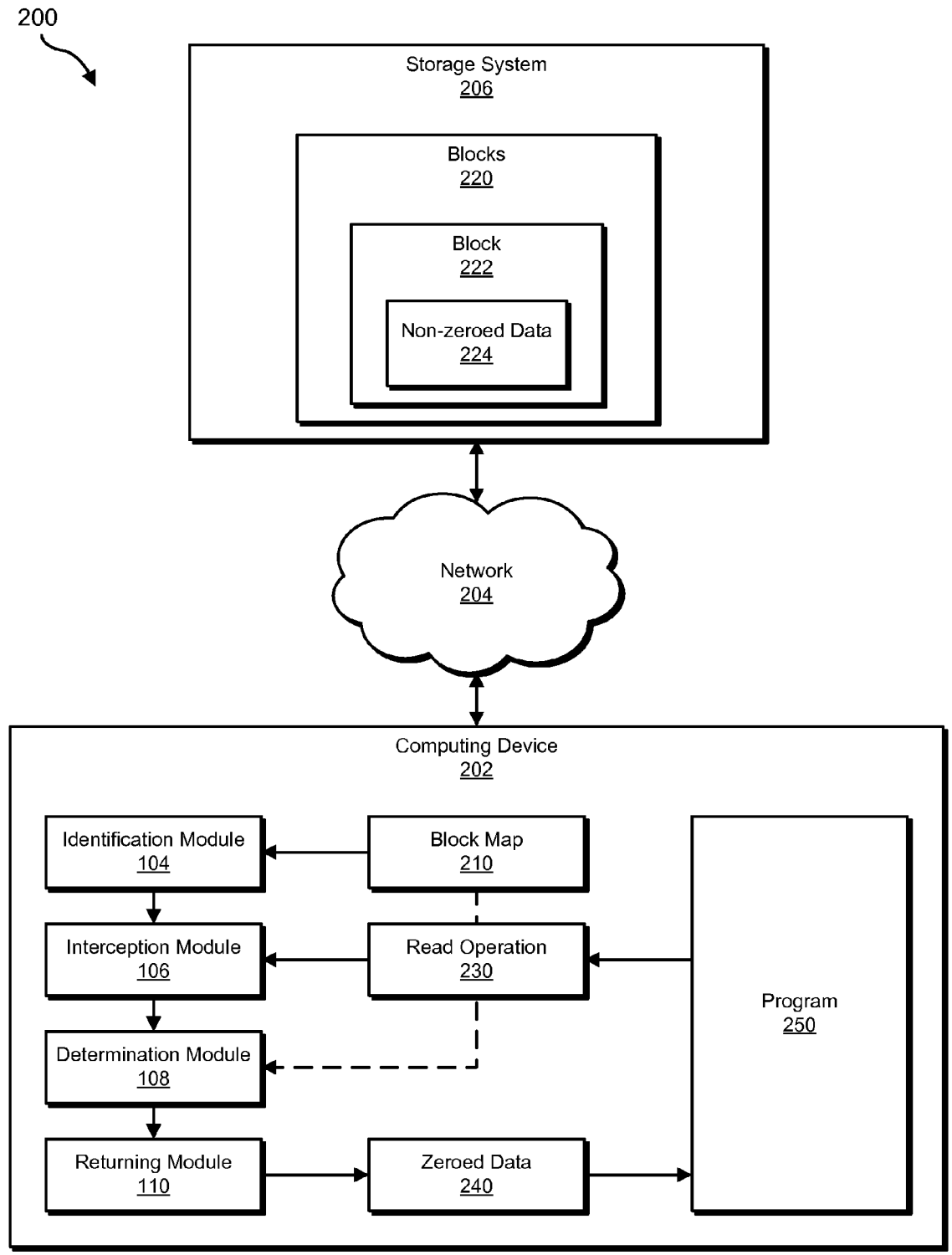
FIG. 2 is a block diagram of an exemplary system for securing storage space.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a storage system 206 via a network 204. Computing device 202 may be programmed with one or more of modules 102. Additionally or alternatively, storage system 206 may be programmed with one or more of modules 102.

In one embodiment, one or more of modules 102 from FIG. 1 may, when executed by at least one processor of computing device 202 and/or storage system 206, facilitate computing device 202 and/or storage system 206 in securing storage space. For example, and as will be described in greater detail below, one or more of modules 102 may cause computing device 202 and/or storage system 206 to 1) identify a block map 210 that indicates whether each of blocks 220 within a storage system 206 is to return zeroed data in response to read operations, 2) identify a read operation 230 directed to a block 222 of storage system 206 that includes non-zeroed data 224, 3) determine, in response to identifying read operation 230, that block map 210 indicates that block 222 is to return zeroed data in response to read operation 230, and 4) return zeroed data 240 in response to read operation 230 based on determining that block map 210 indicates that block 222 is to return zeroed data.

Computing device 202 generally represents any type or form of computing device capable of reading computer-executable instructions. Examples of computing device 202 include, without limitation, desktops, servers, laptops, tablets, cellular phones, personal digital assistants (PDAs), multimedia players, embedded systems, combinations of one or more of the same, exemplary computing system 710 in FIG. 7, or any other suitable computing device.

Storage system 206 may represent portions of a single storage device or a plurality of storage devices. For example, storage system 206 may represent a portion of computing system 710 in FIG. 7 and/or portions of exemplary network architecture 800 in FIG. 8. Alternatively, storage system 206 may represent one or more physically separate devices capable of being accessed by a computing device, such as computing device 202 in FIG. 2, computing system 710 in FIG. 7, and/or portions of exemplary network architecture 800 in FIG. 8. While storage system 206 is depicted in FIG. 2 as connected to computing device 202 via network 204, in some examples storage system 206 may connected directly to computing device 202 and/or otherwise connected to computing device 202 without a network.

Network 204 generally represents any medium or architecture capable of facilitating communication or data transfer. Examples of network 204 include, without limitation, an intranet, a storage area network (SAN), a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing device 202 and storage system 206.

Figure 3:
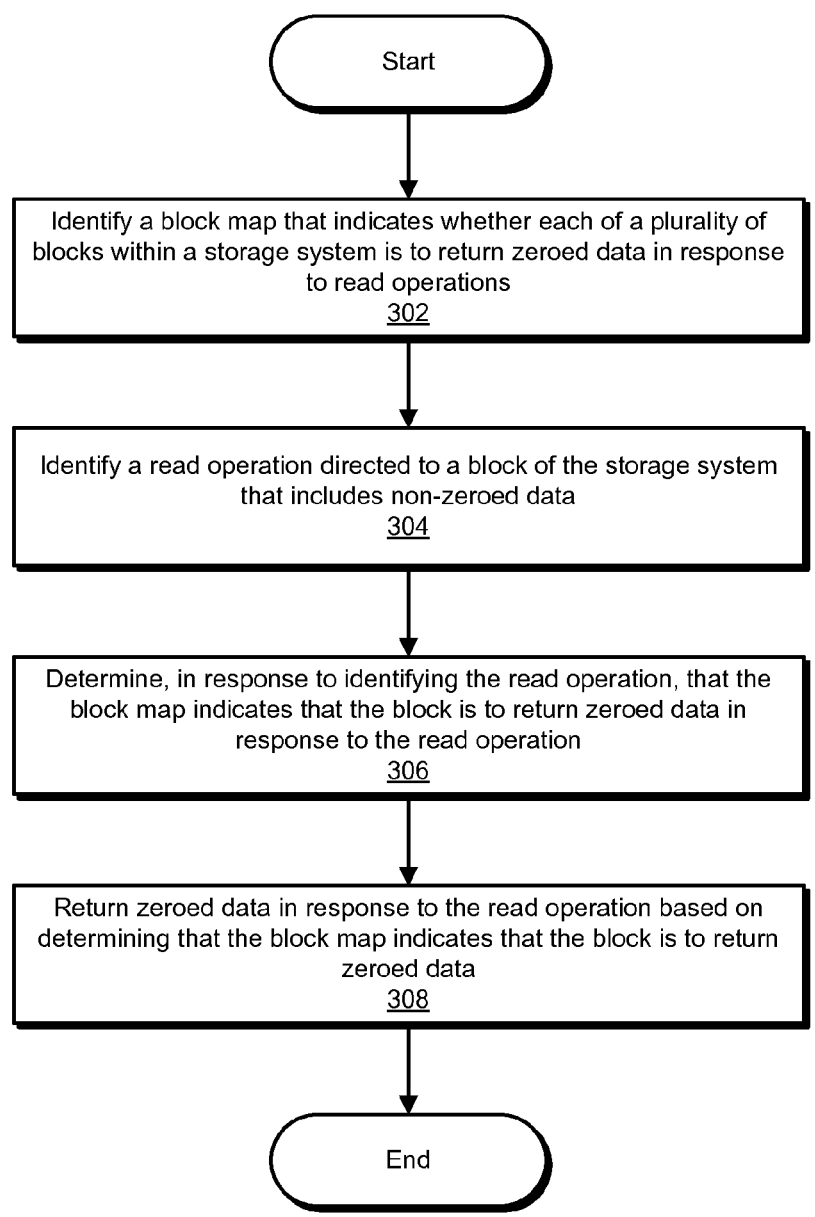
FIG. 3 is a flow diagram of an exemplary method for securing storage space.

FIG. 3 is a flow diagram of an exemplary computer-implemented method 300 for securing storage space. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify a block map that indicates whether each of a plurality of blocks within a storage system is to return zeroed data in response to read operations. For example, at step 302 identification module 104 may, as part of computing device 202 in FIG. 2, identify block map 210 that indicates whether each of blocks 220 within storage system 206 is to return zeroed data in response to read operations.

As used herein, the phrase "storage system" may refer to any storage device and/or collection of storage devices capable of storing data. In some examples, one or more file systems may allocate space from the storage system (e.g., pre-allocate blocks for files of predetermined size). Additionally or alternatively, as will be described in greater detail below, in some examples, one or more thin-provisioned logical storage devices may use the storage system for underlying storage space.

As used herein, the phrase "block map" may refer to any data structure capable of describing an assigned state of multiple blocks. For example, the block map may include a bitmap where each bit of the bitmap corresponds to a different block and indicates whether or not the block is to return zeroed data on read attempts. As used herein, the term "block" may refer to any discrete unit of data. In some examples, the term "block" may refer to a fixed-size unit of data on a storage device. For example, the term "block" may refer to a block, a cluster, and/or a sector.

In some examples, a file may include the plurality of blocks. For example, identification module 104 may identify a block map that indicates whether each block within a file is to return zeroed data in response to read operations. In one example, the file may include a virtual disk file. For example, the block map may indicate whether each block within the virtual disk file is to return zeroed data in response to read operations.

As used herein, the phrase "zeroed data" may refer to any data that is not derived from, does not include, and/or does not describe particular stored data. For example, "zeroed data" may refer to a sequence of zeroes. Additionally or alternatively, "zeroed data" may refer to randomly-generated data. In some examples, "zeroed data" may refer to data that is not read from a storage system. Additionally or alternatively, "zeroed data" may refer to a uniform data block provided in place of stored data.

Identification module 104 may identify the block map in any suitable context. For example, identification module 104 may identify the block map in response to intercepting a read operation (e.g., as a part of a file system filter driver) as will be described in greater detail below.

In some examples, one or more of the systems described herein may initialize the block map. For example, identification module 104 may initialize the block map by marking each free block within the plurality of blocks to indicate that the free block is to return zeroed data in response to read operations. As will be explained in greater detail below, the block map may continue to represent these free blocks as zeroed-out blocks once they are allocated, and one or more of the systems described herein may modify the block map to represent one or more of these free blocks as not zeroed-out once they are written to.

Figure 4:
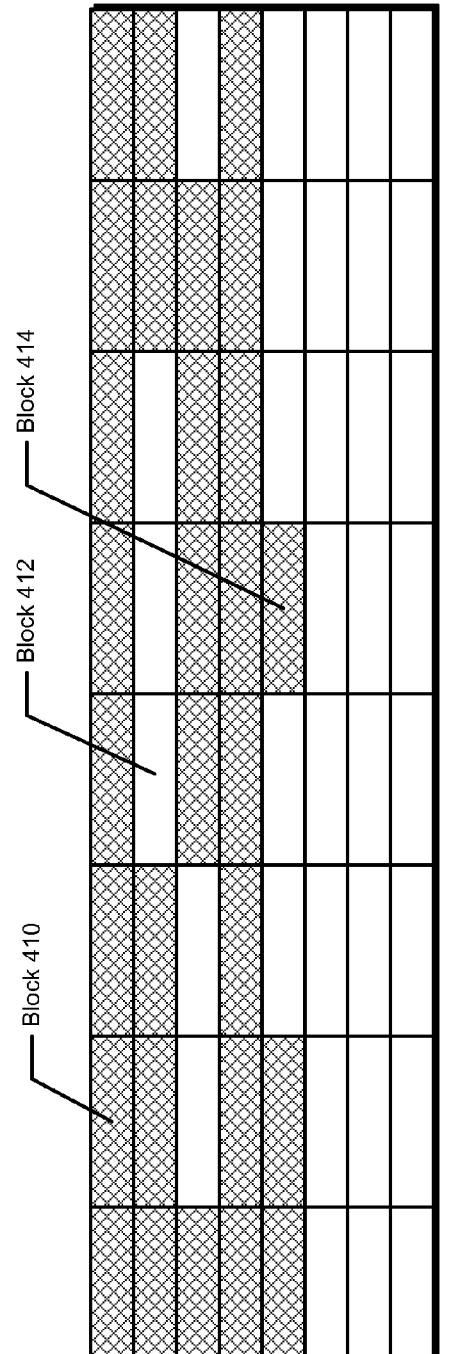
FIG. 4 is a diagram of an exemplary storage device and block map.

FIG. 4 is an illustration of an exemplary storage device 400(a) and an exemplary block map 400(b) of storage device 400(a). As shown in FIG. 4, block map 400(b) may indicate which blocks of storage device 400(a) represent blocks designated as zeroed-out blocks (e.g., blocks that are to return zeroed data upon read requests). Using FIG. 4 as an example, at step 302 identification module 104 may identify block map 400(b). In one example, block map 400(b) may indicate that read operations directed to a block 410 of storage device 400(a) are to return the contents of block 410 (e.g., "0b 10 28 da"). Likewise, block map 400(b) may indicate that read operations directed to a block 414 of storage device 400(a) are to return the contents of block 414 (e.g., "0f d2 83 ca"). Conversely, block map 400(b) may indicate that read operations directed to a block 412 of storage device 400(a) are to return zeroed data (e.g., "00 00 00 00" instead of "d6 ce 4c bc").

Returning to FIG. 3, at step 304 one or more of the systems described herein may identify a read operation directed to a block of the storage system that includes non-zeroed data. For example, at step 304 interception module 106 may, as part of computing device 202 in FIG. 2, identify read operation 230 directed to block 222 of storage system 206 that includes non-zeroed data 224.

As used herein, the phrase "non-zeroed data" may refer to any stored data. For example, "non-zeroed data" may refer to data stored within a block on a storage device (e.g., as a part of a file). In some examples, "non-zeroed data" may refer to data that is read from a storage system.

Interception module 106 may identify the read operation in any suitable context. For example, interception module 106 may intercept the read operation as a part of a file system filter driver (e.g., before the read operation can be relayed to the storage system). As will be explained in greater detail below, in some examples the read operation will not continue to the storage system (e.g., if the read operation is on a block designated as a zeroed block by the block map).

In some examples, one or more of the systems described herein may identify one or more additional operations directed to the block. For example, interception module 106 may identify a write operation directed to the block (e.g., interception module 106 may intercept the write operation as a part of a file system filter driver). In this example, one or more of the systems described herein may mark the block map to not indicate that the block is to return zeroed data in response to read operations.

Figure 5:
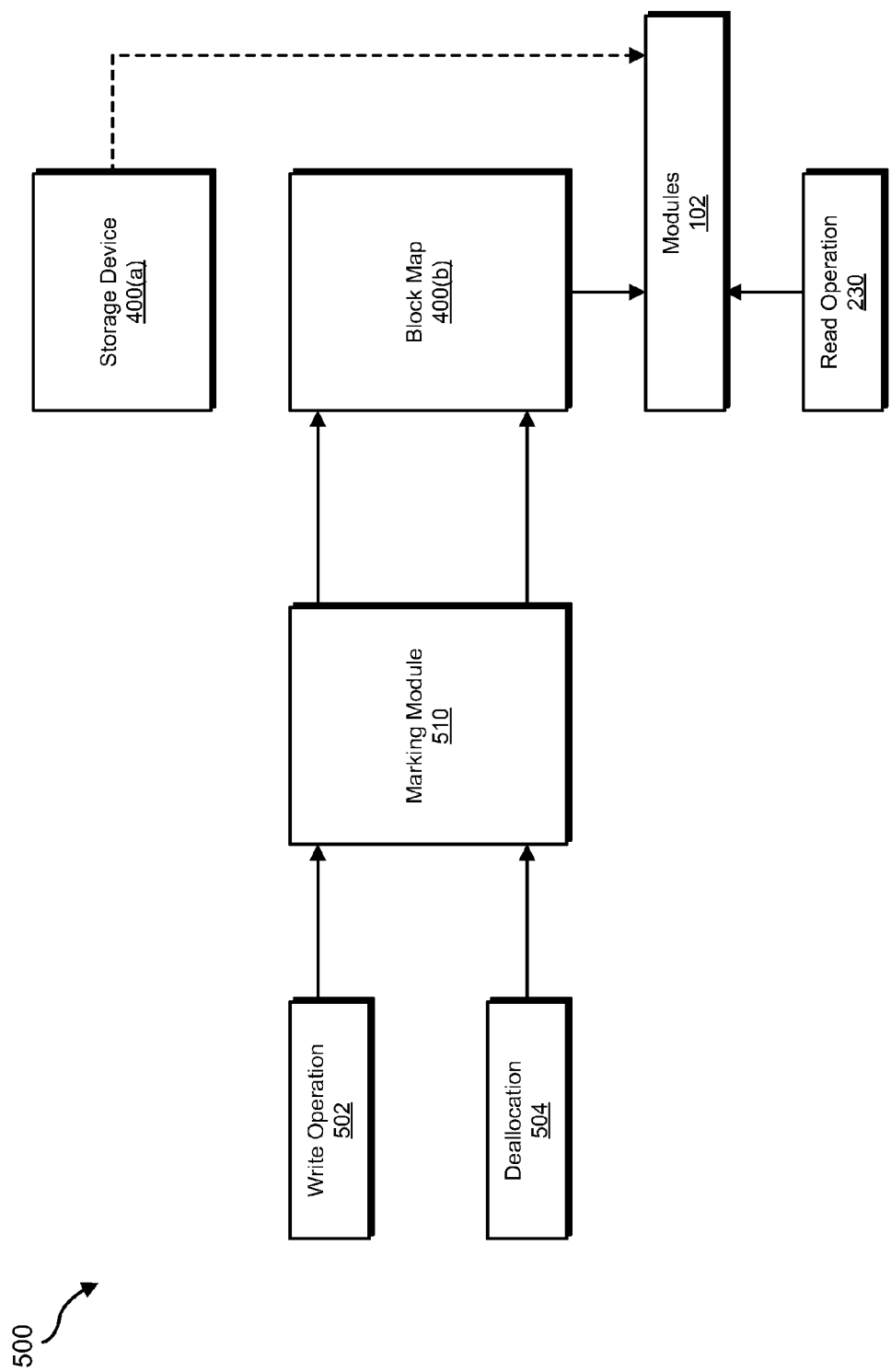
FIG. 5 is a block diagram of an exemplary system for securing storage space.

FIG. 5 illustrates an exemplary system 500 for securing storage space. As shown in FIG. 5, exemplary system 500 may include a marking module 510, modules 102, storage device 400(a), and block map 400(b). Using FIG. 5 as an example, marking module 510 may identify a write operation 502 directed to the block and, in response, may mark block map 400(b) to not indicate that the block (e.g., within storage device 400(a)) is to return zeroed data in response to read operations (e.g., by modifying block map 400(b) to indicate that the block is to return the non-zeroed content of the block). For example, marking module 510 may identify a write operation 502 directed to block 412 and mark block map 400(b) to indicate that read operations directed to block 412 are to return the contents of block 412 (e.g., "d6 ce 4c be") instead of zeroed data.

In another example of additional operations directed to the block, interception module 106 may identify a deallocation directed to the block (e.g., interception module 106 may intercept the deallocation as a part of a file system filter driver). In this example, one or more of the systems described herein may mark the block map to indicate that the block is to return zeroed data in response to read operations. Additionally or alternatively, the systems described herein may be configured to mark the block map to indicate that the block is to return zeroed data after the block is allocated again (e.g., pre-allocated for use in a file of a predetermined size).

Using FIG. 5 as an example, marking module 510 may identify a deallocation 504 directed to the block and, in response, may mark block map 400(b) to indicate that the block (e.g., within storage device 400(a)) is to return zeroed data in response to read operations. For example, marking module 510 may identify a deallocation 504 directed to block 414 and mark block map 400(b) to indicate that read operations directed to block 414 are to return zeroed data instead of the contents of block 414. In this example, block 414 may later be pre-allocated for use in a file, but a read operation performed on the file may return "00 00 00 00" instead of the contents of block 414 (e.g., "0f d2 83 ca").

In some examples, one or more of the systems described herein may also 1) identify an additional block map and 2) mark the additional block map to indicate that the block is subject to a trim operation in response to identifying the deallocation of the block. In these examples, these systems may mark the block map to indicate that the block is to return zeroed data before the trim operation is performed. Accordingly, in some examples, the additional block map may represent whether each block is a free but previously allocated block.

As used herein, the phrase "trim operation" may refer to any operation that informs a storage device that one or more blocks of data are free (e.g., and, therefore, may be cleared, reset, and/or zeroed-out). For example, the phrase "trim operation" may refer to an operation performed on a solid-state drive (e.g., to prepare the solid-state drive for a future write because the solid-state drive performs writes more efficiently from a cleared state).

For example, identification module 104 may identify the additional block map. In some examples, the additional block map may have been copied from the block map and/or may be updated in parallel with the block map (e.g., except that the additional block map may be updated to mark blocks for future trim operations). Likewise, marking module 510 may mark the additional block map to indicate that the block is subject to the trim operation. Because marking module 510 may mark the block map to indicate that the block is to returned zeroed data before the trim operation is performed instead of delaying marking the block map until the trim operation is issued, the deallocation transaction may be completed without a delay. Accordingly, the systems and methods described herein may avoid performance degradation for some operations. For example, a file system flush may be performed without additional performance degradation because the delayed trim operations may not have caused pending transactions requiring completion. Accordingly, these systems and methods may employ trim operations without impacting transaction processing.

In some examples, one or more of the systems described herein (e.g., determination module 108) may use the additional block map to optimize a reclamation operation for a thin-reclamation-capable storage device by determining which free blocks were previously allocated within the storage system. For example, determination module 108 may limit a range of blocks to attempt to reclaim by only attempting to reclaim free blocks allocated previously. Additionally or alternatively, determination module 108 may use the additional block map to reuse previously allocated blocks for a thin-reclamation-capable storage device. In some examples, determination module 108 may reuse previously allocated blocks during defragmentation on a thin-reclamation-capable storage device (e.g., to avoid the allocation of one or more previously unused blocks). In some examples, determination module 108 may (e.g., during a deduplication operation) free space near free blocks that were previously allocated as opposed to space separated from free blocks that were previously allocated in order to create a range of previously allocated free space and thereby improve storage utilization.

In the above examples, after the trim operation and/or reclamation operation is performed, one or more of the systems described herein may clear the representation of the block within the additional block map (e.g., such that the additional block map no longer represents the block as a free but previously allocated block). Additionally or alternatively, in some examples, one or more of the systems described herein may identify an allocation of the block before a trim operation and/or reclamation operation is performed on the block, in which case one or more of the systems described herein may clear the representation of the block within the additional block map (e.g., such that the additional block map no longer represents the block as a free but previously allocated block).

Returning to FIG. 3, at step 306 one or more of the systems described herein may determine, in response to identifying the read operation, that the block map indicates that the block is to return zeroed data in response to the read operation. For example, at step 306 determination module 108 may, as part of computing device 202 in FIG. 2, determine, in response to identifying read operation 230, that block map 210 indicates that block 222 is to return zeroed data in response to read operation 230.

Determination module 108 may determine that the block map indicates that the block is to return zeroed data in response to the read operation in any suitable manner. Using FIG. 5 as an example, determination module 108 may read a part of block map 400(b) corresponding to block 412 of storage device 400(a) and determine that the part of block map 400(b) contains a value indicating "return zeroed data."

In some examples, one or more of the systems described herein may process an attempt to read another block of the storage system. For example, interception module 106 may identify an additional read operation performed on an additional block of the storage system. Determination module 108 may then determine, in response to identifying the additional read operation, that the block map does not indicate that the additional block is to return zeroed data in response to the additional read operation. Using FIG. 5 as an example, determination module 108 may, in response to a read operation 504 directed to block 410, read a part of block map 400(b) corresponding to block 410 of storage device 400(a) and determine that the part of block map 400(a) contains a value indicating "return block contents."

Returning to FIG. 3, at step 308 one or more of the systems described herein may return zeroed data in response to the read operation based on determining that the block map indicates that the block is to return zeroed data. For example, at step 308 returning module 110 may, as part of computing device 202 in FIG. 2, return zeroed data 240 in response to read operation 230 based on determining that block map 210 indicates that block 222 is to return zeroed data.

Returning module 110 may return zeroed data in any of a variety of ways. For example, returning module 110 may return a string of zeroes in the size of the block. Additionally or alternatively, returning module 110 may return randomized data in the size of the block. In some examples, returning module 110 may return a uniform data block provided in place of stored data.

In some examples, returning module 110 may return the zeroed data without reading the zeroed data from the block on the storage system. For example, the block on the storage system may include non-zeroed data, and returning module 110 may block and/or cancel a read operation that was directed to the block.

As mentioned earlier, in some examples one or more of the systems described herein may have identified an additional read operation performed on an additional block of the storage system and determined, in response to identifying the additional read operation, that the block map does not indicate that the additional block is to return zeroed data in response to the additional read operation. In these examples, returning module 110 may read and return content of the additional block in response to determining that the block map does not indicate that the additional block is to return zeroed data. Using FIG. 5 as an example, returning module 110 may read block 410 from storage device 400(a) and return the contents of block 410 in response to read operation 504.

Figure 6:
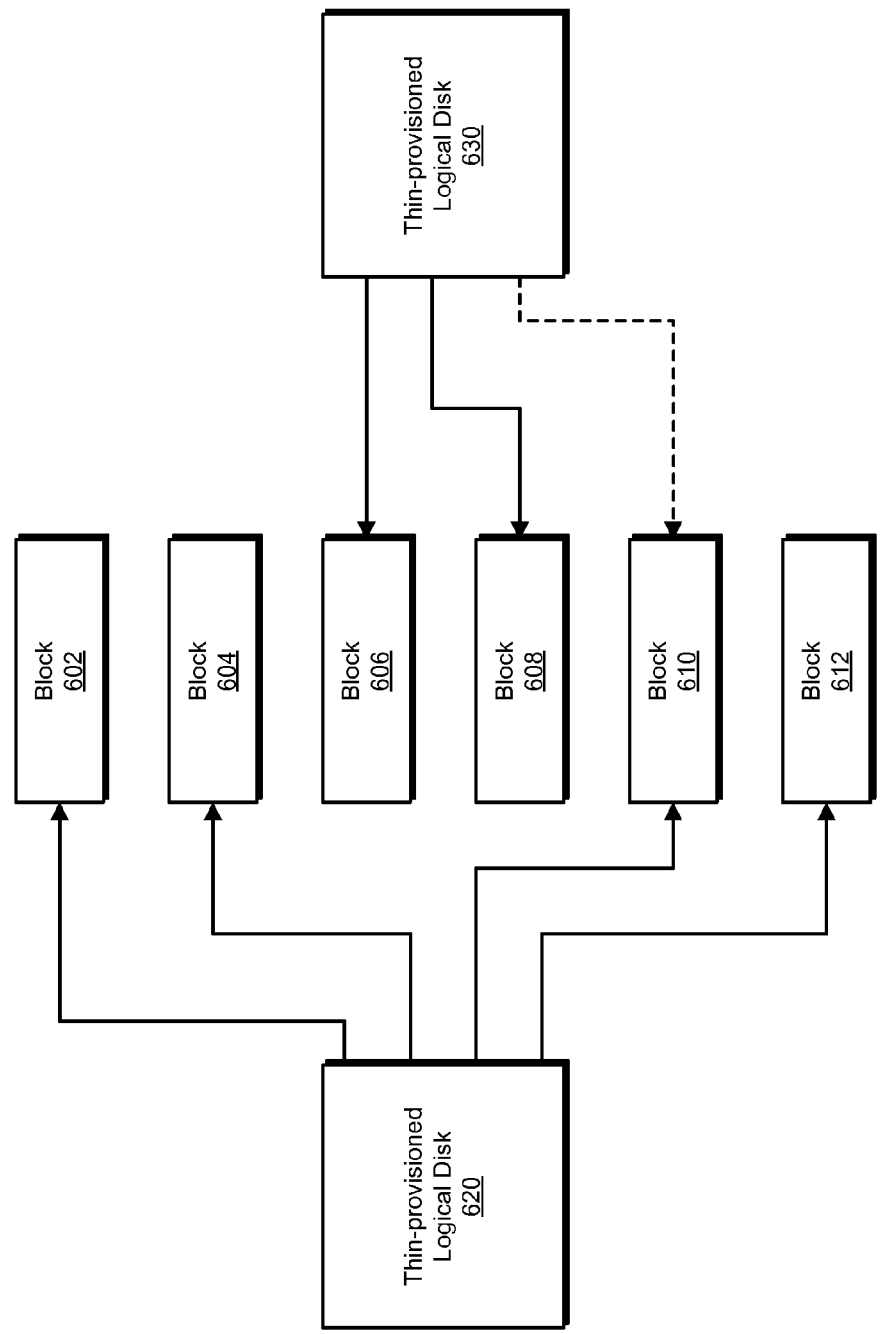
FIG. 6 is a block diagram of an exemplary thin-provisioning system.

In some examples, one or more of the systems described herein may operate in the context of thin-provisioned storage. For example, the block may have been previously allocated for use in an old thin-provisioned logical disk and may be currently allocated for use in a new thin-provisioned logical disk while still including data from the old thin-provisioned logical disk. In this example, the read operation may be directed to the block within the new thin-provisioned logical disk, but the systems and methods described herein may return zeroed data instead of the contents of the block that were written to the block as a part of the old thin-provisioned logical disk. FIG. 6 illustrates an exemplary thin-provisioning system 600. As shown in FIG. 6, exemplary system 600 may include a thin-provisioned logical disk 620 and a thin-provisioned logical disk 630. Thin-provisioned logical disks may use, e.g., blocks 602, 604, 606, 608, 610, and 612 for underlying storage. For example, thin-provisioned logical disk 630 may have used and written to blocks 606, 608, and 610. Block 610 may then have been deallocated from thin-provisioned logical disk and allocated to thin-provisioned logical disk 620. Block 610 allocated to thin-provisioned logical disk 620 may include contents previously written to block 610 when block 610 was allocated to thin-provisioned logical disk 630. However, a read attempt to block 610 as a part of thin-provisioned logical disk 620 may return zeroed data based on the block map.

As used herein, the phrase "thin-provisioned volume" may refer to a volume for which storage space is allocated on an as-needed and/or just-in-time basis. Additionally or alternatively, the phrase "thin-provisioned volume" may refer to a volume that may represent more available storage space than is exclusively allocated for the volume. In some examples, the phrase "thin-provisioned volume" may refer to a volume using storage space allocated from a common storage pool (e.g., with other thin-provisioned volumes).

As explained above, by maintaining a block map for blocks that are to be zeroed out and reading first from the block map to determine whether to return zeroed data or the actual content of the corresponding block, the systems and methods described herein may provide zeroed data where desired (e.g., pre-allocated blocks) while avoiding costly write operations to zero out blocks. Additionally, these systems and methods may avoid unnecessary read operations on zeroed blocks by providing zeroed data on the basis of the block map instead of performing read operations on an underlying storage device. In some examples, these systems and methods may also provide information for thin provisioning systems (e.g., for reclaiming zeroed-out blocks, for providing zeroed data without writing zeroed data to blocks moving between thin-provisioned logical storage devices, etc.). In some examples, these systems and methods may also prevent transaction processing delays by maintaining an additional block map for pending trim operations. In these examples, these systems and methods may also use the additional block map to improve storage utilization for thin-provision-capable storage devices, to optimize reclamation operations performed for such devices, and/or to prevent the allocation of previously unused free space.

Figure 7:
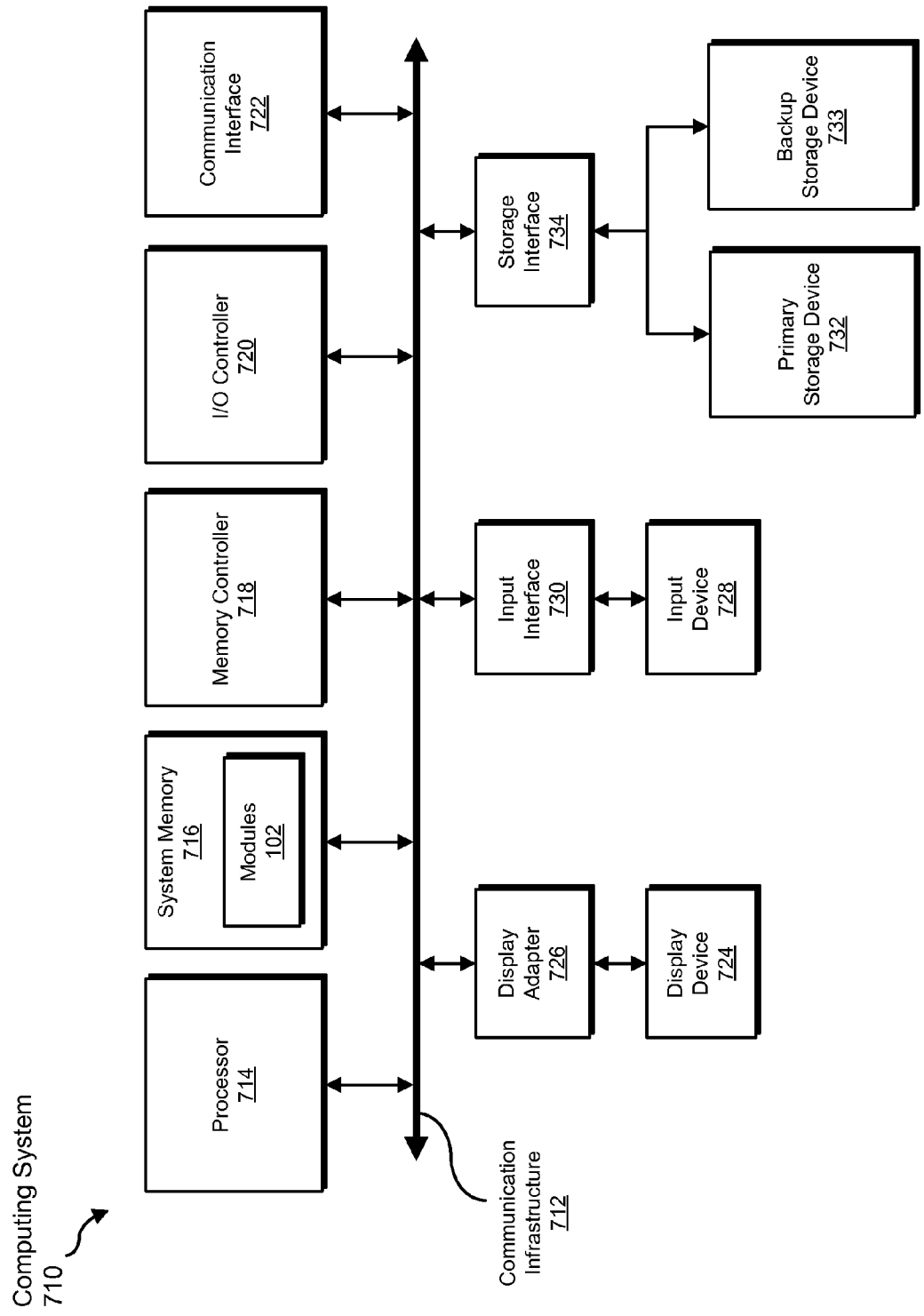
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the identifying, initializing, marking, determining, returning, and reading steps described herein. All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
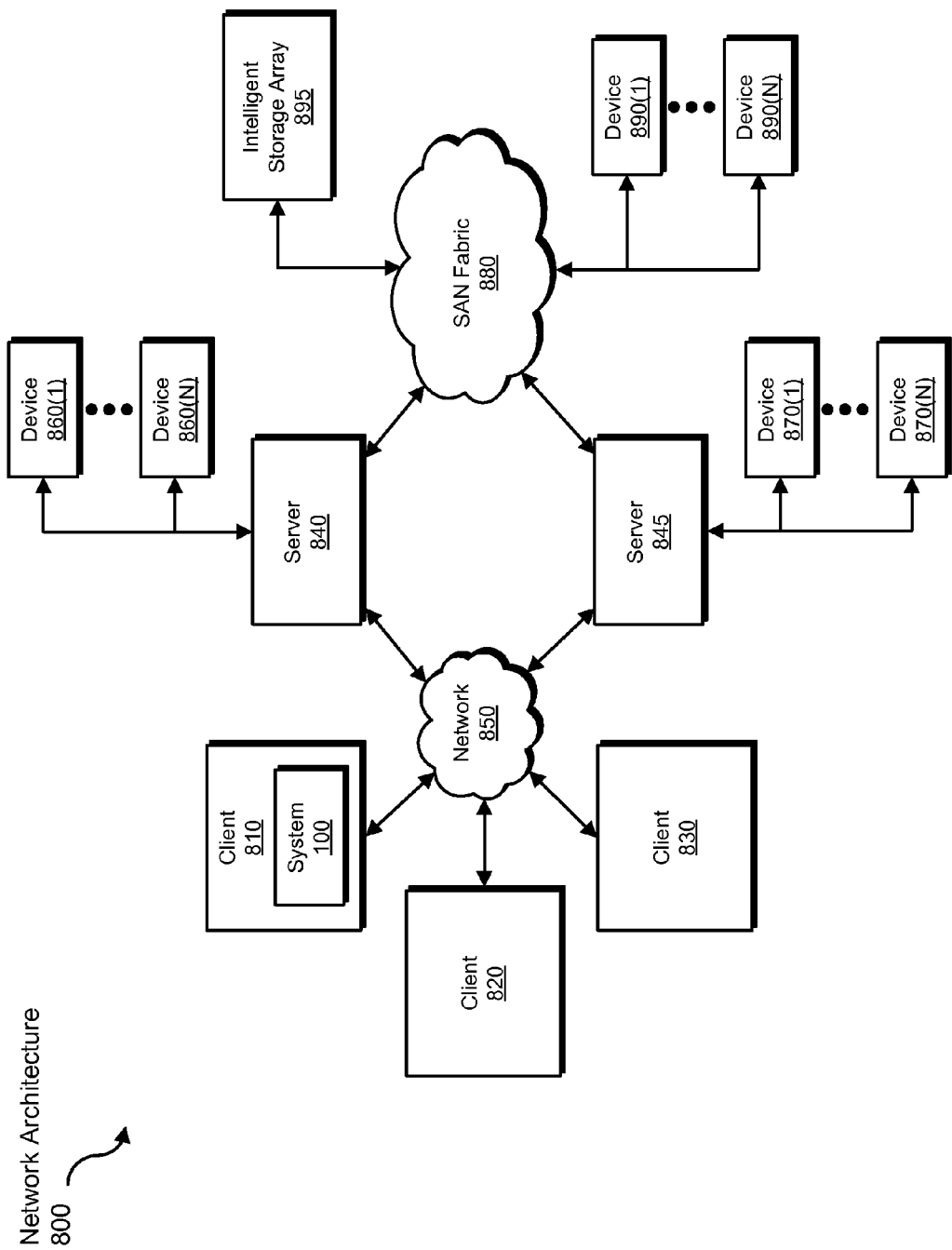
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the identifying, initializing, marking, determining, returning, and reading steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for securing storage space.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive read operations to be transformed, transform the read operations based on a block map, output a result of the transformation to a requesting application, use the result of the transformation to provide zeroed data and protect potentially sensitive non-zeroed data, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for securing storage space, at least a portion of the method being performed by a computing device comprising at least one processor, the method comprising:
   identifying a deallocation operation directed to a block, within a storage system, whose contents comprise non-zeroed data, wherein the block was previously allocated for use in an old thin-provisioned logical disk;
   in response to identifying the deallocation operation, marking a block map to indicate that the block is to return, in response to read operations, zeroed data instead of the contents of the block;
   marking an additional block map to indicate that the block is subject to a pending trim operation by the storage system and to represent the block as a free but previously allocated block in response to identifying the deallocation operation directed to the block, wherein the additional block map was copied from the block map and is updated in parallel with the block map;
   wherein marking the block map to indicate that the block is to return zeroed data comprises marking the block map to indicate that the block is to return zeroed data before the trim operation is performed;
   identifying a read operation directed to the block;
   determining, in response to identifying the read operation, that the block map indicates that the block is currently allocated for use in a new thin-provisioned logical disk while still comprising data from the old thin-provisioned logical disk and is to return, in response to read operations, zeroed data instead of the contents of the block;

returning, in response to the read operation, zeroed data instead of the contents of the block in response to determining that the block map indicates that the block is to return zeroed data instead of the contents of the block in order to protect potentially sensitive data previously stored on the old thin-provisioned logical disk.

2. The computer-implemented method of claim 1, wherein returning the zeroed data comprises returning the zeroed data without reading the zeroed data from the block on the storage system.

3. The computer-implemented method of claim 1, further comprising:
identifying a write operation directed to the block;
in response to identifying the write operation, marking the block map to indicate that the block is to return the block's contents in response to read operations.

4. The computer-implemented method of claim 1, further comprising:
after identifying the deallocation operation directed to the block, identifying an allocation operation directed to the block;
in response to identifying the allocation operation, marking the block map to indicate that the block is to return zeroed data in response to read operations.

5. The computer-implemented method of claim 1, further comprising:
identifying an additional read operation directed to an additional block of the storage system;
determining, in response to identifying the additional read operation, that the block map indicates that the additional block is to return the additional block's contents in response to read operations;
reading and returning the additional block's contents in response to determining that the block map indicates that the additional block is to return the additional block's contents.

6. The computer-implemented method of claim 1, further comprising initializing the block map by marking each free block within the storage system to indicate that the free block is to return zeroed data in response to read operations.

7. The computer-implemented method of claim 1, wherein a file comprises the block.

8. The computer-implemented method of claim 1, further comprising completing a transaction that includes the deallocation operation before executing the trim operation.

9. The computer-implemented method of claim 8, further comprising:
identifying a deduplication operation to perform that involves freeing storage space within the storage system;
identifying a first candidate storage space with a physical address that is more proximate to a physical address of the block than to a physical address of a second candidate storage space;
selecting the first candidate storage space to free via the deduplication operation based on the first candidate storage space being more proximate to the block and the additional block map representing the block as free but previously allocated to create a range of previously allocated free space for improved storage utilization.

10. The computer-implemented method of claim 1, further comprising optimizing a reclamation operation for a thin-reclamation-capable storage device within the storage system by restricting a reclamation operation to a range of free blocks within the storage system that were previously allocated as indicated by the additional block map.

11. The computer-implemented method of claim 1, further comprising optimizing a defragmentation operation for a thin-reclamation-capable storage device within the storage system by reusing, in the defragmentation operation, at least one free but previously allocated block, as indicated by the additional block map, to avoid allocating a previously unused block.

12. A system for secure storage space, the system comprising:
an interception module programmed to:
identify a deallocation operation directed to a block, within a storage system, whose contents comprise non-zeroed data, wherein the block was previously allocated for use in an old thin-provisioned logical disk;
identify a read operation directed to the block;
a marking module programmed to:
in response to identification of the deallocation operation, mark a block map to indicate that the block is to return, in response to read operations, zeroed data instead of the contents of the block;
mark an additional block map to indicate that the block is subject to a pending trim operation by the storage system and to represent the block as a free but previously allocated block in response to identifying the deallocation operation directed to the block, wherein the additional block map was copied from the block map and is updated in parallel with the block map;
wherein marking the block map to indicate that the block is to return zeroed data comprises marking the block map to indicate that the block is to return zeroed data before the trim operation is performed;
a determination module programmed to determine, in response to identification of the read operation, that the block map indicates that the block is currently allocated for use in a new thin-provisioned logical disk while still comprising data from the old thin-provisioned logical disk and is to return, in response to read operations, zeroed data instead of the contents of the block;
a returning module programmed to return, in response to the read operation, zeroed data instead of the contents of the block in response to determining that the block map indicates that the block is to return zeroed data instead of the contents of the block in order to protect potentially sensitive data previously stored on the old thin-provisioned logical disk;
at least one processor configured to execute the interception module, the determination module, and the returning module.

13. The system of claim 12, wherein the returning module is programmed to return the zeroed data by returning the zeroed data without reading the zeroed data from the block on the storage system.

14. The system of claim 12, wherein the marking module is further programmed to:
identify a write operation directed to the block;
in response to identifying the write operation, mark the block map to indicate that the block is to return the block's contents in response to read operations.

15. The system of claim 12, wherein the marking module is further programmed to:
after identification of the deallocation operation directed to the block, identify an allocation operation directed to the block;
in response to identifying the allocation operation, mark the block map to indicate that the block is to return zeroed data in response to read operations.

16. The system of claim 12, wherein:
the interception module is further programmed to identify an additional read operation directed to an additional block of the storage system;
the determination module is further programmed to determine, in response to identification of the additional read operation, that the block map indicates that the additional block is to return the additional block's contents in response to read operations;
the returning module is further programmed to read and return the additional block's contents in response to determining that the block map indicates that the additional block is to return the additional block's contents.

17. The system of claim 12, further comprising an identification module programmed to initialize the block map by marking each free block within the storage system to indicate that the free block is to return zeroed data in response to read operations.

18. The system of claim 12, wherein a file comprises the block.

19. A non-transitory computer-readable medium comprising one or more computer-executable instructions that, when executed by at least one processor of a computing device, cause the computing device to:
identify a deallocation operation directed to a block, within a storage system, whose contents comprise non-zero data, wherein the block was previously allocated for use in an old thin-provisioned logical disk;
in response to identifying the deallocation operation, mark a block map to indicate that the block is to return, in response to read operations, zeroed data instead of the contents of the block;
mark an additional block map to indicate that the block is subject to a pending trim operation by the storage system and to represent the block as a free but previously allocated block in response to identifying the deallocation operation directed to the block, wherein the additional block map was copied from the block map and is updated in parallel with the block map;
wherein marking the block map to indicate that the block is to return zeroed data comprises marking the block map to indicate that the block is to return zeroed data before the trim operation is performed;
identify a read operation directed to the block;
determine, in response to identifying the read operation, that the block map indicates that the block is currently allocated for use in a new thin-provisioned logical disk while still comprising data from the old thin-provisioned logical disk and is to return, in response to read operations, zeroed data instead of the contents of the block;
return, in response to the read operation, zeroed data instead of the contents of the block in response to determining that the block map indicates that the block is to return zeroed data instead of the contents of the block in order to protect potentially sensitive data previously stored on the old thin-provisioned logical disk.

20. The non-transitory computer-readable medium of claim 19, wherein the one or more computer-executable instructions cause the computing device to return the zeroed data without reading the zeroed data from the block on the storage system.

* * * * *